Aug. 29, 1933.  E. A. SPERRY, JR  1,924,816
DIRECTIONAL GYROSCOPE FOR BOREHOLE TESTERS AND OTHER USES
Filed Jan. 9, 1930
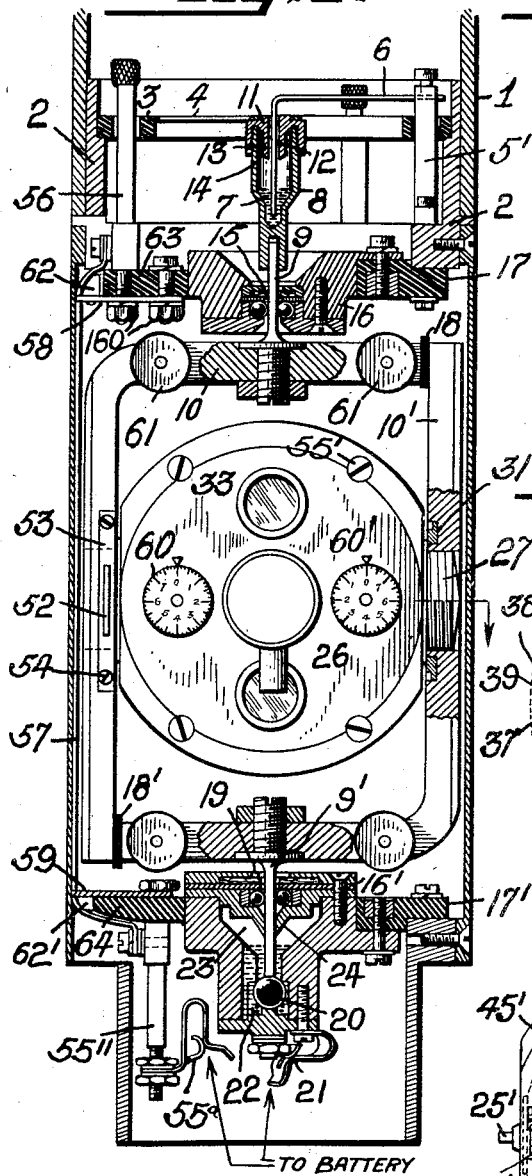
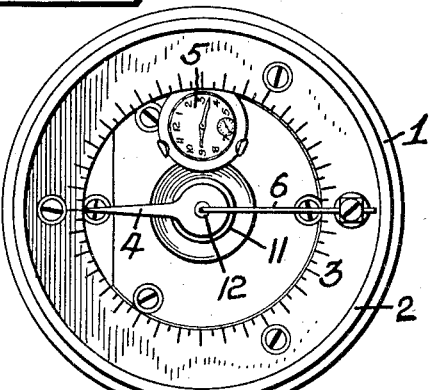
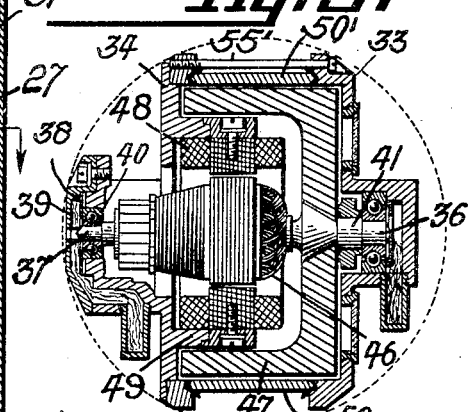
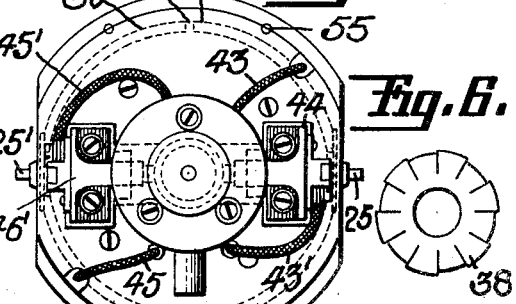
INVENTOR
ELMER A. SPERRY, JR.
BY Herbert H. Thompson
his ATTORNEY.

Patented Aug. 29, 1933

1,924,816

UNITED STATES PATENT OFFICE 1,924,816

DIRECTIONAL GYROSCOPE FOR BOREHOLE TESTERS AND OTHER USES

Elmer A. Sperry, Jr., Brooklyn, N. Y., assignor to Sperry Gyroscope Company, Inc., Brooklyn, N. Y., a corporation of New York Application January 9, 1930. Serial No. 419,483

12 Claims. (Cl. 74—78)

This invention relates to testing devices for boreholes, and more especially to the gyroscopic unit used in such devices to maintain and record direction, the gyroscopic unit herein described and claimed being an improvement upon the directional gyro element shown as a part of my prior invention on borehole position indicators, for which application for Letters Patent was filed on April 15, 1929, Serial No. 355,088.

On account of the very limited space available within the borehole, several troublesome difficulties arose in constructing a satisfactory gyroscopic unit. One of the difficulties was to lead in current to the gyroscope without exerting a torque on the same. While small fine wires could be used for maintaining the spin after the gyroscope is once brought up to speed, during the accelerating period the gyro requires a fairly heavy current which fine, light wires cannot carry without overheating. I have devised a special means for leading in current practically without the use of any looped wire at all leading to or hanging on the gyroscope, the current being carried entirely in through the pivotal supports for the gyroscope.

Obviously my invention also has application to other types of gyroscopes besides the particular type of borehole tester shown herein. Other features of the invention will become apparent as the description proceeds.

Referring to the drawing showing the preferred form of the invention,

Fig. 1 is a vertical section through the portion of the borehole tester containing the gyro unit.

Fig. 2 is a plan view of the top of the unit showing the indicating end and time piece.

Fig. 3 is a vertical section through the gyro casing and rotor, the section being taken at right angles to Fig. 1.

Fig. 4 is a rear view of the gyro casing showing the wires leading to the motor brushes.

Fig. 5 is a section on an enlarged scale of one of the horizontal supporting bearings for the gyro casing.

Fig. 6 is an enlarged view of a spring washer used in the gyroscope to take up end play.

A portion of the shell of the borehole unit is shown at 1 and within the same is supported the gyroscopic directional unit. This unit is shown as comprising a ring 2 which supports the dial 3 on which the pointer 4, secured to the gyroscope, reads. There is also supported thereon a chronometer 5 which is used to indicate the depth of the borehole as explained in my prior application. Said watch or chronometer is preferably magnetically shielded so that it is not disturbed by electric current or other magnetic influences within the borehole. One side of the electric circuit leading to the gyroscope is preferably grounded and electrical connection is made to the ring 2 through the bracket-clamp 5' and spring wire 6, the lower end of which dips into mercury 7 within the pot 8. Said pot is secured at its lower end to a stem 9 rising from the vertical ring 10 of the gyro unit. At its upper end said pot is covered by a screw cap 11 which carries the pointer 4. Said cap is provided with a central aperture 12 extending through the central downwardly extending boss 13, the construction being such that the mercury in the bottom of the pot cannot escape between the stem 6 and the bore of the boss since there is not sufficient mercury to overflow the annular space 14 between the boss and the pot if the device is turned on its side or upside down. By this I form a non-spillable mercury connection between the gyroscope and the casing which has a minimum amount of friction. The stem 9 is journalled in a non-frictional guide bearing 15 in the bracket 16 which is insulated from and supported by an annular ring 17 from the ring 2.

The vertical ring, so called, is divided into two L shaped halves, one half 10 being electrically connected with the stem 9 and the other half 10' insulated therefrom at 18 and 18'. The half 10' is supported by and electrically connected to the threaded stem 9' at its base, said stem having radial bearing 19 journalled in bushing 16', said bushing being likewise supported on an annular member 17' of insulating material. The stem 9' is shown as supported on a ball 20 at its base. Current is led into the stem 9' from the spring clip 21 and battery (not shown), thence through the mercury 22 within the lower part of the bushing. Said bushing is likewise made non-spillable by providing sufficient space at 23 to contain the mercury when the device is turned upside down without spilling between the stem 9' and the extension 24 from the bearing. Current is lead from each half of the vertical ring 10—10' to the motor through the horizontal bearings 25—25' which support the gyro casing 26 for oscillation about a horizontal axis within the vertical ring.

The preferred construction of each of said bearings is shown in Fig. 5. A thimble 27 is threaded in the vertical ring and within said thimble is secured the anti-friction bearing 28 which has a ball 29 at the end of the stub shaft 25 to take up end play. Such a bearing, which operates practically without oil or with very thin oil, will conduct electricity perfectly to the shaft 25, but in order to prevent possible sparking at the bearing and consequent pitting of the polished surfaces, I provide a shunt path for the current from the ring 10' to the gyro. This is in the form of a very light helical spring 30 anchored at one end to a ring 31 and at the other end to the stub shaft 25. Said ring is rotatably mounted in an annular recess in the inner side of the vertical ring 10', so that by turning the ring 31 the tension on the spring can be reduced to zero in each direction. An annular flange 51 projects from the ring and extends at both sides through a slot 52 in each of two spring clamps 53 secured by set screws 54 to the outer faces of the upright 10. By screwing down these set screws, the spring clamps bind against the outer surface of the ring 50 thus holding it in its adjusted position.

The gyro casing itself is constructed of several sections, insulated from each other. The stub shafts project from each of a pair of split rings 50 and 50' which form the central portion of the casing. Said rings are insulated from each other at 32—32' and are also insulated from the end plates 33—34 which form the ends of the casing and are clamped together on the periphery of the rings by bolts 55'. Current which enters through stub shaft 25 is carried through the wire 43 clipped to the ring 50 to the field coils and from thence through wire 43' to one of the brushes 44. The other wire 45 likewise extends from a ring 50' to the field coils and thence through wire 45' to the other brush 46'. No current is, therefore, carried by the rotor bearings 36—37 which are carried in the insulated end plates 33—34.

In order to take up end play in the rotor bearing shaft I provide a spring washer 38 positioned within the end plate 39 secured to the bearing and clamped against the end of plate 34. Said spring washer is provided with slots (see Fig. 6) and is sprung so that when it is clamped in position it exerts a spring pressure against the outer race of the ball bearing 40 so that all end play in the bearing is thus taken up and the rotor shaft 41 is maintained centralized. Both the motor armature 46 and rotor proper 47 are placed on said shaft, the rotor being U-shaped in cross section so that the periphery thereof overlies the field coils 48. Said coils are shown as supported on annular extension 49 from the back plate 34. Adjustable weights for correcting the balance of the gyroscope to compensate for different latitudes are shown at 60 and 60'. Additional adjustable balancing weights 61 are mounted on the vertical ring.

In order to lead current from the spring clip 55ª at the bottom of the gyroscope up to the binding post 56 above the gyroscope, which post is connected to other electrically operated portions of the mechanism (not shown), such as the camera motor, I have shown a novel arrangement in which means are provided for preventing any possibility of the connecting wire becoming fouled by the rotatable vertical ring of the gyroscope. For this purpose I employ a flat spring or strip 57 as the conductor between the post 55" and 56, said strip being insulated. The strip is stretched between the two posts over the ends of adjustable plates 58—59 clamped in position by nuts 160 so as to maintain the strip both under tension and flatly and firmly against the outer wall of the main casing 1. If desired, wedges 62—62' may also be driven in between the flat spring and the insulated bases 63—64 which support the binding posts.

From the foregoing, the operation of my invention should be clear. The grounded side of the current is led into the gyroscope through the mercury cup 7 and vertical stem 9 at the top, thence through the left hand half 10 of the vertical ring, and thence through the left hand supporting trunnion 25' to the split ring 50' of the casing, and from thence through the wire 45 to the motor. The other side of the line comes up through the mercury pot 22, stem 9', part 10' of the vertical ring, the right hand trunnion 25, and split ring 50 on the casing, and thence through wire 43 to the motor. The major part of the current at all times is taken by the ball bearings 28, but a shunt path is provided by spring 30 which effectively prevents sparking at the bearing.

In accordance with the provisions of the patent statutes, I have herein described the principle and operation of my invention, together with the apparatus which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having described my invention, what I claim and desire to secure by Letters Patent is:

1. In an electrically spun gyroscope comprising a two-part outer ring, bearing means at opposite sides thereof for pivoting the same about an axis, anti-friction means for leading current in at each pivotal means, a gyro rotor, a spinning motor and a multi-part casing for said rotor and motor, anti-friction bearings for pivotally supporting said casing between the two parts of said ring, and electrical connections between opposite parts of said casing and the windings of said motor.

2. A gyroscope as claimed in claim 1 characterized by the provision of light wire connections between the ring and the gyro-casing at the anti-friction bearings to provide a shunt path for the current passing through the bearing.

3. In an electrically spun gyroscope comprising the combination with the rotor and spinning motor, a multi-part casing therefor having a two-part central portion one part being insulated from the other, a bearing means carried by each part through which current is introduced, a pair of end plates insulated from said central portion and having the rotor bearings therein, and electrical connections from said two-part central portion to the windings of said motor.

4. In an electrically spun gyroscope comprising the combination with the rotor and spinning motor, a multi-part casing therefor having a two-part central portion, one part being insulated from the other, a bearing means carried by each part through which supply current is introduced, a fine coil spring furnishing a shunt path for the current between each part of said casing and the supply, a pair of end plates insulated from said central portion and having the rotor bearings therein, and electrical connections from said two-part central portion to the windings of said motor.

5. An electrically spun directional gyroscope comprising the combination with the rotor and spinning motor, of a multi-part casing therefor having a two-part central portion, one part being insulated from the other, a bearing means carried by each part through which current is introduced, a pair of end plates insulated from said central portion and having the rotor bearings therein, electrical connections from said two-part central portion to the windings of said motor, a two-part vertical ring carrying said casing bearing means, an upper bearing on one part of said ring, a lower vertical bearing on the other part of said ring, and non-spillable mercury cups for leading in current through each of said vertical bearings.

6. In a supporting bearing for electrically spun gyroscopes and the like, the combination with the gyro casing and supporting ring having an aperture for the bearing, a ring rotatably mounted inside of said ring adjacent the aperture, a light coil spring secured at one end to said rotatable ring, a trunnion on said casing to which the other end of said spring is secured, and a bearing member threaded in said aperture having balls therein to engage said trunnion whereby the main current is carried through said bearing to the gyroscope, and means whereby said rotatable ring may be adjusted to take out torsion in said coil springs when the gyroscope is in its normal position.

7. An electrically spun directional gyroscope comprising the combination with the rotor and spinning motor, of a multi-part casing therefor, one part being insulated from another, a bearing means carried by each of the two parts referred to through which current is introduced, electrical connections from each of said parts to the windings of said motor, a two-part vertical ring in which said casing is journalled, said parts being journalled in opposite parts of said ring an upper bearing on one part of said ring, a lower vertical bearing on the other part of said ring, and non-spillable mercury cups for leading in current through each of said bearings.

8. An electrically spun directional gyroscope comprising the combination with the rotor and spinning motor, of a multi-part casing therefor, one part being insulated from another, a bearing means carried by each of the two parts referred to through which current is introduced, electrical connections from each of said parts to the windings of said motor, a two-part vertical ring in which said casing is journalled, said parts being journalled in opposite parts of said ring, an upper bearing on one part of said ring, and a lower vertical bearing on the other part of said ring.

9. An electrically spun directional gyroscope comprising the combination with the rotor and spinning motor, of a multi-part casing therefor having a two-part central portion, one part being insulated from the other, a bearing means carried by each of said two parts through which current is introduced, a pair of end plates insulated from said central portion and havng the rotor bearings therein, electrical connections from said two-part central portion to the windings of said motor, a two-part vertical ring carrying said casing bearing means, an upper bearing on one part of said ring, and a lower vertical bearing on the other part of said ring.

10. In an electrically spun gyroscope of the class described, a two-part outer or vertical ring, bearing means at opposite sides thereof for pivoting the same about an axis, anti-friction means for leading current in at each pivotal means, a gyro rotor, a spinning motor and a two-part casing therefor, anti-friction bearings for pivotally supporting the same between the two parts of said ring, and electrical connections between each part of said casing and the windings of said motor.

11. An electrically spun gyroscope as claimed in claim 10 characterized by the provision of light wire connections between the ring and the gyro casing at each anti-friction bearing to provide a shunt path for the main current passing through the bearing.

12. An electrically spun gyroscope as claimed in claim 10 characterized by the provision of light wire connections between the ring and the gyro casing at each anti-friction bearing to provide a shunt path for the main current passing through the bearing, and means for adjusting the wire connections to remove unbalanced torsion.

ELMER A. SPERRY, Jr.